(12) United States Patent
Ingram et al.

(10) Patent No.: US 8,762,507 B1
(45) Date of Patent: Jun. 24, 2014

(54) METHOD AND SYSTEM FOR MANAGING AN INFORMATION TECHNOLOGY SYSTEM

(75) Inventors: Paul Stewart Ingram, Fremont, CA (US); Robert Leslie Day, San Diego, CA (US); Kristoffer John Grandy, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2230 days.

(21) Appl. No.: 11/644,366

(22) Filed: Dec. 22, 2006

Related U.S. Application Data

(60) Provisional application No. 60/753,693, filed on Dec. 23, 2005.

(51) Int. Cl.
*G06F 15/173* (2006.01)
(52) U.S. Cl.
USPC .......................................... 709/223

(58) Field of Classification Search
USPC .......................................... 709/223
See application file for complete search history.

(56) References Cited

U.S. PATENT DOCUMENTS

| | | | | |
|---|---|---|---|---|
| 5,765,154 | A * | 6/1998 | Horikiri et al. | 1/1 |
| 6,438,642 | B1 * | 8/2002 | Shaath | 711/100 |
| 6,535,518 | B1 * | 3/2003 | Hu et al. | 370/401 |

* cited by examiner

*Primary Examiner* — Noel Beharry
*Assistant Examiner* — Farhad Ali

(57) ABSTRACT

A network management system may comprise a file system daemon and a device proxy. The file system daemon may be configured to represent a property of a physical device of the plurality of physical devices and a resource as objects in a virtual file system, receive an instruction associated with the property of the physical device and another instruction associated with the resource from a single interface, identify the physical devices of the plurality of physical devices associated with each instruction, and determine the commands associated with each instruction. The device proxy may be configured to implement the commands.

19 Claims, 5 Drawing Sheets

METHOD AND SYSTEM FOR MANAGING AN INFORMATION TECHNOLOGY SYSTEM

CROSS-REFERENCE

This nonprovisional United States patent application claims the benefit of provisional U.S. patent application No. 60/753,693 filed Dec. 23, 2005 and entitled "Method and System for Managing an Information Technology System" which is hereby incorporated by reference.

BACKGROUND

1. Field of the Invention

Various embodiments of the invention relate generally to the field of networking. More specifically, the embodiments relate to a method and system for managing devices on a network.

2. Description of the Related Art

An information technology (IT) system comprises physical devices connected over a network. These devices typically include switches, routers, servers, and the like. Each device may have access to a distinct set of resources including data, application programs, file systems, or the like. To manage a large IT system, a network administrator may access each of the devices connected to the network.

Tracking and managing physical devices can be a complex and difficult task. Currently, administrators may use a database or database model to record data identifying and/or describing the devices on a network. Unfortunately, these databases can become outdated or corrupted easily. Further, databases do not provide access to the physical devices from a remote location.

Administrators often use multiple applications to manage physical devices since no current single application can access, control, and manage the network, physical devices, and properties of the physical devices. Unfortunately, multiple applications can conflict with each other. They also require training time by the administrator to use effectively and may be expensive.

Outside of IT system management, various tools have been developed separately to address other needs. To manage complex data sets, for example, a virtual file system can be used to represent various resources such as data files. Virtual file systems allow a user to store data normally stored in a file system and data relating to attributes of the files such as versions, authors, updates, and the like. ClearCase, for example, uses a virtual file system to operate a source code control repository. Current virtual file systems, however, do not manage datacenters or other large networks.

To retrieve files stored on a remote networked device connected to a network, the Network File System (NFS) developed by Sun Microsystems may be used. Using NFS, users of computers of different operating systems on different computers can access data stored on a remote computer. Different applications within the NFS are limited in management of multiple remote computers.

To maintain network security while sharing files or executing programs on remote computers, the Secure Shell (SSH) protocol, for example, provides a way to establish a secure communication channel between two computers. In one example, the remote computer may authenticate the client based on a request transmitted over SSH. The client may then execute programs on the remote computer.

While these applications can be used to meet specific needs, they do not provide a unified way of managing a large network. There exists a need for a network management system that is able to present and manage networked devices in a network within a uniform environment.

SUMMARY

A network management system may comprise a file system daemon and a device proxy. The file system daemon may be configured to represent a property of a physical device of the plurality of physical devices and a resource as objects in a virtual file system, receive an instruction associated with the property of the physical device and another instruction associated with the resource from a single interface, identify the physical devices of the plurality of physical devices associated with each instruction, and determine the commands associated with each instruction. The device proxy may be configured to implement the commands.

BRIEF DESCRIPTION OF THE DRAWINGS

Various embodiments of the invention will hereinafter be described in conjunction with the appended drawings provided to illustrate and not to limit the invention, wherein like designations denote like elements, and in which.

DESCRIPTION OF VARIOUS EMBODIMENTS

Various embodiments of the invention provide a method, system and a computer program product for managing an information technology (IT) system. In accordance with one embodiment of the invention, a network management system is implemented to control the IT system. The network management system comprises a virtual file system that can allow a user to manage the IT system as if it is a traditional file system. The virtual file system can treat an object, such as a server, as a file and/or directory. Further, the network management system is configured to automatically retrieve data from a database, a representation of a networked device associated with the network, and/or additional resources.

The network management system can interact with the user through any interface configured to access and/or manipulate files, such as a command line, through which the user may input text or selections to navigate and manage the IT system. By representing the IT system as a virtual file system, the user can interact with the IT system through the interface as a traditional file system. In various embodiments, the network management system may not comprise a specialized interface but rather interact with standard interfaces associated with different operating systems. The network management system allows users to manage the devices in the IT system without requiring multiple applications and/or new network management tools.

The network management system can receive input from the user of the interface and interpret those commands for operation by and/or within the IT system. The devices within the IT system can be represented as files and/or directories in a file system. Similarly, the network management system can receive and interpret data (e.g., responses) by and/or from within the IT system so that the data may be displayed to the user. In some embodiments, the displayed data as well as the commands comprise text.

The virtual file system described herein is able to navigate to, and communicate with, the devices in the IT system. Thus, a traditional tool that is able to navigate and access files within a traditional file system may be similarly able to navigate and access the virtual file system to control the objects within the IT system. For example, a user can write to a "server" directory to update a configuration of the server. Because traditional tools can be used, a specialized client is not required to work within the virtual file system.

In various embodiments, the IT system comprises a datacenter. A datacenter comprises multiple computers, routers, firewalls, and switches often housed together in a remote location. In some examples, the datacenter may comprise a server farm or a plurality of web servers.

Figure 1:
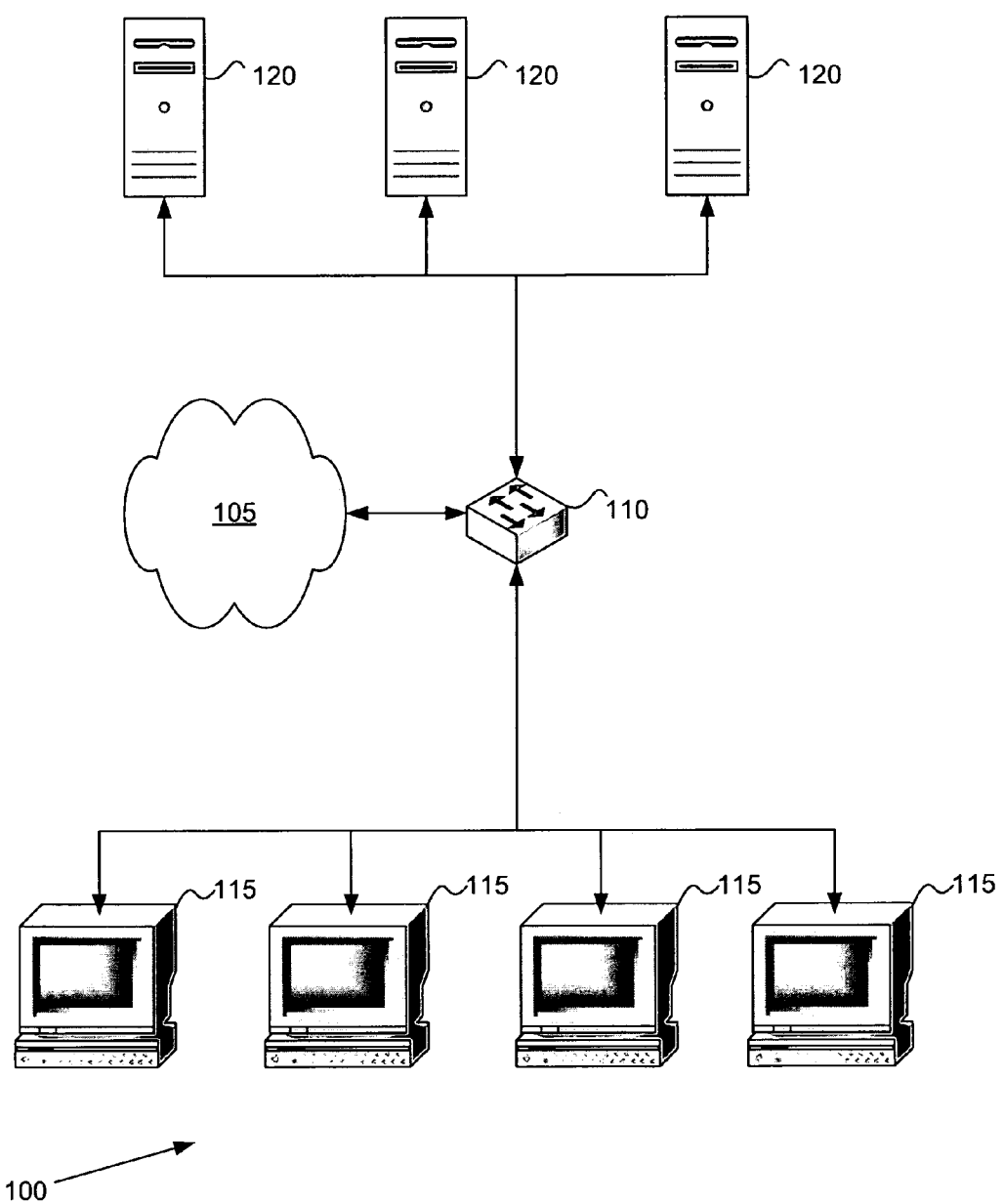
FIG. 1 is a diagram of an environment in which various embodiments of the invention may be practiced.

FIG. 1 is a diagram of an information technology (IT) system 100 in which various embodiments of the invention may be practiced. The IT system 100 may include a network comprising various devices (e.g., networked devices) as well as resources and properties of the networked devices. A networked device is any device that may be coupled to a network (e.g., switch 110, computational devices 115, and servers 120). Other types of networked devices include routers, switches, load balancers, storage arrays, and the like. A networked device can comprise a physical device or any digital device that may be coupled to the network. The virtual file system can access and manage objects which may be represented as file and/or directories. An object may be a networked device, a resource, or a property.

Other networked devices, represented as objects within the virtual file system, may comprise abstract data. The abstract data may be, for example, software to be installed for a proposed datacenter. In another example, the networked data may related to one or more networked devices to be installed at a later time. The abstract data may be stored in a memory associated with the virtual file system and include data about networked devices, resources, permissions data, and/or properties of the devices.

Resources are, for example, programs, applications, APIs, running services, ports, and file systems that may be found within one or more of the networked devices. Properties comprise information associated with the networked device and/or resource. In various embodiments, examples of properties of a networked device comprise location, status (on/off/standby), configuration, identity, type of networked device, identity of the owner, and the permissions of users that may operate the networked device. Examples of properties of a resource include status, configuration, identity, type of resource, and the permissions of users that may operate the resource. Properties may be received from the devices themselves or be supplied by the user.

The IT system 100 comprises an external network 105, switch 110, one or more servers 120, and one or more computational devices 115. Similar to the IT system 100, the external network 105 may be any network. A network may comprise a wide area network, a local area network, a peer to peer network, Internet, or any other type of network.

The switch 110 is any networked device configured to transmit and receive data within the IT system 100. In some examples, the switch 110 comprises a router, a bridge, a gateway, or a server.

The one or more servers 120 are any digital devices configured to share resources or properties with the external network 105, the switch 110, the computational devices 115, or other servers 120. Computational devices 115 are any devices configured to communicate with other devices. Examples of computational devices include, but are not limited to, personal computers, servers, laptops, routers, firewalls, switches, storage arrays, and fiber channel switches.

In accordance with various embodiments of the invention, various networked devices such as the switch 110, servers 120, and computational devices 115 in the IT system 100 interact with each other to access and share various resources associated with the networked devices. In accordance with an embodiment of the invention, in IT system 100, computational devices 115 access resources such as file systems and applications stored on each other and servers 120. Computational devices 115 may also access resources via external network 105. The sharing of resources across computational devices 115, servers 120, and external network 105 can be facilitated by, for example, switch 110.

Although various modules are shown in FIG. 1 in association with the IT system 100 (the external network 105, the switch 110, the computational devices 115, and the servers 120), fewer or more networked devices may comprise the IT system 100 and still fall within the scope of various embodiments.

Figure 2:
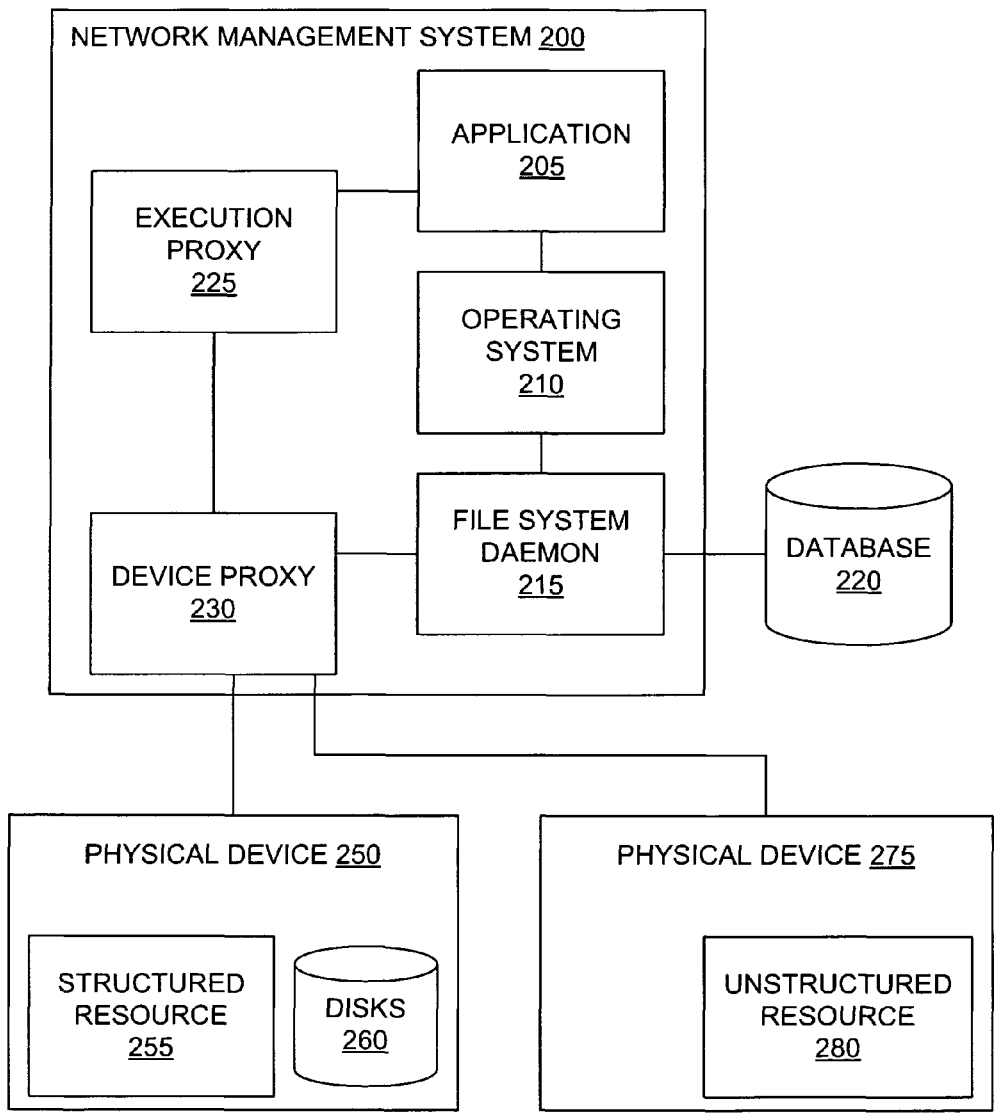
FIG. 2 is a block diagram of a system for network management, in accordance with various embodiments of the invention.

FIG. 2 is a block diagram of a system for network management, in accordance with various embodiments of the invention. The network management system 200 may be within any digital device (e.g., computational device 115 or server 120.) The network management system 200 is a network management system that can represent objects within the IT system 100 as a virtual file system to allow a user to navigate, access, configure, and control at least one networked device or resource. The networked devices may include a structured device 250 and/or an unstructured device 275. The network management system 200 may be implemented as hardware, software, firmware, or in any combination of hardware, software, or firmware on a networked device in the IT system 100.

In various embodiments, the network management system 200 is configured to display information regarding the IT system 100 as a virtual file system. In one example, the application 205 displays an interface such as a command line prompt to indicate the network management system 200 is ready to receive commands. The user may access, manage, or control one or more networked devices, resources, and properties as well as non-device database data via the interface. Networked devices, resources, and properties may be displayed as paths to directories (e.g., networked devices) and files (e.g., resources, properties of networked devices, or properties of resources) which represent devices, resources and properties associated with the devices of the virtual file system.

The application 205 may be any program or application configured to interact with a file system. In one example, the application 205 is a native application of an operating system. In another example, the application 205 may be programmed to interact with the virtual file system of the network management system 200.

In one example, a user may login to server-1 and attempt to activate a backup agent, by entering the following at the command prompt ("$"):

$server-1\backup_agent to run the backup agent within the application 205. In another example, a user accesses a command line through the application 205. The user may then type text commands to manage networked devices, resources, properties of the networked devices, and/or properties of the resources. In one example, the network management system 200 can receive the text commands from the user, identify the networked device related to the command, and transmit the appropriate commands to access and manage the networked device, resource, and/or property. Instructions may be entered as a line of text (that is, sequences of typed characters) and output may also be received as text. In other embodiments, the application 205 may comprise a graphical user interface (GUI) that allows a user to navigate to the various networked devices through the virtual file system.

In various embodiments, the user can type standard unix commands into a command line and manipulate networked devices as files and/or directories in the virtual file system. In one example, the user may enter "cd server-1" to address server-1 in the IT system 100. The command line may now reflect the address "[prompt]\server-1". The user may edit a resource or property associated with server-1 using a simple unix editor. The instructions are transmitted to the file system daemon 215 which identifies the command and requests the device proxy 230 to implement the change. This process is further described herein.

The application 205 may be accessible from one or more networked devices in multiple locations. In various embodiments, the application 205 comprises a graphical user interface, command line interpreter (e.g., command line interface) such as Unix shells (sh, ksh, csh, tcsh, bash, etc.), the historical CP/M (Control Program/Monitor) and/or Dos's command.com ("command prompt"). A command prompt is a sequence of one or more characters used in a command line interface to indicate availability to accept commands. In some examples, command prompts may end with one of the characters $, #, :, > and often include other information such as the command path.

The operating system 210 comprises software configured to convert high level commands received by the application 205 from the user to low level commands that can be executed by a file system daemon 215. The operating system 210 may be configured to operate multiple file system such as NFS, FAT16, FAT32, NTFS, HPFS, S51K, ext2, AFS, and the like. In one example, the operating system 210 interacts with the virtual file system of the network management system 200 as any file system.

The file system daemon 215 is configured to construct a virtual file system based on information contained within the IT database 220. For example, the networked devices may be represented as directories and the resources of the networked devices may be represented as subdirectories. The information stored in the virtual file system may be accessed and manipulated by performing file system operations with the application 205. The operating system can process the instructions received from the application 205 and send basic commands to the file system daemon 215. The file system daemon 215 is configured to execute file system commands such as "lookup," "open," "read," "getattr," and "readdir." Further, the IT system 100 may be queried using a hierarchical path received from a user.

A networked device within the IT system 100 may be identified by a user who enters a networked device identifier at the command prompt. A networked device identifier is any identifier that identifies one or more networked devices within the IT system 100. In one example, a networked device identifier may identify a type of networked device (e.g., server or router).

The database 220 includes configuration information and/or properties related to one or more networked devices, resources, and properties in the IT system 100. In some embodiments, agents are programmed to identify and store information from networked devices and resources within the database 220. The database 220 may comprise multiple databases, tables, linked lists, and/or other data structures. The database 220 may store the objects (e.g., representations or information of networked devices, resources, properties of resource, properties of networked devices) representing the IT system 100 in any manner. Although the database 220 is depicted in FIG. 2 as outside the network management system 200, the database 220 may be within the network management system 200.

In one example, each networked device such as a physical device 250 or a physical device 275, is identified in a table within the database 220. Associated with the each physical device 250 and 275 in the table is resource information, property information, and/or configuration information. The resource information associated with the physical device 250 is information regarding one or more structured resources 255 within the physical device 250. Property information is information regarding one or more properties of the physical devices 250 and 275 and/or properties regarding one or more properties of the resources within the physical devices 250 and 275. Configuration information comprises settings associated with the device and/or resources on the physical devices 250 and 275. In other embodiments, the file system daemon 215 may retrieve information directly from a networked device such as physical device 250 or physical device 275.

The execution proxy 225 is configured to access and transmit commands to networked devices, services or resources on the networked devices. The networked devices can comprise the physical device 250 and the physical device 275. The execution proxy 225 and/or application 205 may initiate and/or configure sessions between the networked devices and a user of the network management system 200. The execution proxy 225 may further act as a proxy for communicating data between the user and the device proxy 230.

In one example, the user may log into a networked device within the IT system 100 by providing the networked device identifier and account login name into a command line interface. The user may then invoke execution proxy 225 (e.g., by entering the text "execproxy" at the interface (e.g., command prompt)). Commands subsequently entered by the user into the interface may be transmitted directly to the networked device. Responses from the logged networked device may be received by the device proxy 230 which transmits the response to the execution proxy 225. In another example, responses, after being processed by the file system daemon 215 and/or the operating system 210, may be displayed by the application 205.

The device proxy 230 is configured to manage communications between the network management system 200 and the networked devices and/or resources. The device proxy 230 is configured to communicate using a variety of network communications protocols. In some embodiments, the functions performed by the device proxy 230 and the file system daemon 215 may be performed by a single component or module. To maintain network security, the device proxy 230 may log in to the networked device using an account login name. The device proxy 230 may facilitate communication between the networked devices and the execution proxy 225 and/or the file system daemon 215.

In one example, the device proxy 230 transforms commands received from the file system daemon 215 and transmits the commands in a form that may be understood by the networked device or resource. In one example, the device proxy 230 formats the commands to a form that is appropriate for the networked device that is to receive the command. Similarly, the device proxy 230 may receive data (e.g., a response) from the networked device or resource. The data is then transformed (e.g., formatted) by the file system daemon 215 and/or the operating system 210 into a form that may be displayed by the application 205. The device proxy 230 may also retrieve transformation instructions from the database 220.

In another example, the device proxy 230 receives a networked device identifier from the file system daemon 215 and proceeds to log onto the identified networked device. Subsequently, the device proxy 230 may pass a request for a login and password through the file system daemon 215 to the application 205 to display the request at the command line interface. Once the login and password is entered by the user, the device proxy 230 may retrieve the instructions necessary to log into the networked device and then transmit the proper login commands with the username and password.

The networked device may respond that the login was successful. The response may be received by the device proxy 230 which sends the response to the file system daemon 215 and the operating system 210 to provide the information associated with the response to the application 205 which may display the identity of the networked device. In various embodiments, the command prompt may display the networked device identifier during every action taken while logged into the networked device until the networked device is logged out. Once the user terminates the session with the networked device, the interface may no longer display the networked device identifier.

Although FIG. 2 depicts the execution proxy 225 as coupled with the device proxy 230, the execution proxy 225 may communicate directly with the physical device 250 and/or the physical device 275. Those skilled in the art will appreciate that the execution proxy 225 may communicate with the networked devices in many ways.

The device proxy 230 may set up a session with a physical device 250. The physical device 250 comprises a structured resource 255 that can be represented within the virtual file system. The physical device 250 may further comprise disks 260. The device proxy 230 may be configured to set up a session with a physical device 275. The physical device 275 may comprise a router, switch, or other device that operates within the IT system 100. The physical device 275 may be associated with an unstructured resource 280 which may not be represented in the virtual file system. An example of an unstructured resource can be a program or running service. The device proxy 230 may initiate a session with the physical device 275 so that a user may update or change the unstructured resource 280.

The device proxy 230 or file system daemon 215 may also check to ensure that a user with a specific account login name has the proper permission to perform subsequent commands. In one example, to access the IT system 100 via the virtual file system, the user may provide an account login name. The user may then seek to log into other networked devices as another user. In one example, the user may log into the network management system 200 as "user1" and then seek to make alterations to a server as "root" through the virtual file system. Resources associated with each of the networked devices are mapped into the virtual file system. These mappings may be contained within the database 220. Further, properties, such as permissions, associated with one or more networked devices and resources may be contained within the database 220.

The file system daemon 215 may determine if the user logged into the network management system 200 has permission to access different networked devices as different usernames. The user that logs in to the network management system 200 may have the permission to access a particular device as "httpd" but not as "root". The user "httpd" may have limited permission to make changes or view resources associated with the particular device while the "root" user may have no such limitations. Access to the virtual file system, in these embodiments, may be consistent with the native access control mechanism of the individual networked devices.

The file system daemon 215 can determine the permissions limited to the user logged into the network management system 200 based on a privilege data structure within the database 220, the file system daemon 215, and/or the device proxy 230. These permissions may be determined by an administrator which then may store the permissions within the privilege data structure.

In various embodiments, the network management system 200 can manage networked devices and resources without clients or agents being included in one or more networked devices and/or resources. A client is a program that is designed to allow the networked device or resource to interface with the network management system 200. In one example, the device proxy 230 retrieves instructions from the database 220 so as to transmit commands to different networked devices in a form that the networked device can natively understand without further processing. The network management system may utilize standard APIs. By avoiding the installation of separate clients on networked devices, time and expense can be saved. In other embodiments, clients and/or agents may be installed on one or more networked devices for communication with the network management system 200.

Although various modules are shown in FIG. 2 in association with the network management system 200, fewer or more modules may comprise the network management system 200 and still fall within the scope of various embodiments.

The network management system 200 may be utilized to perform many functions related to network management, including activating, deactivating, configuring, altering, and controlling networked devices, resources, and/or properties. The network management system 200 may also be used to query the IT system to identify networked devices, resources, and properties. In one example further described herein, the network management system 200 may be used to query the network to identify networked devices of a specific type (e.g., servers, brand of server, model of server, status of the server (on/off)), resources of a specific type (e.g., networked devices that comprise the resource, version of the resource, status of the resource (on/off)), and properties of a specific type (e.g., all networked devices at a specific location or network, the identity of each user that has permission to access a networked device or resource, and the OS type of networked devices).

A method for managing a plurality of networked devices associated with the IT system is provided. The method may be performed by the network management system 200. The method allows a user of the network management system 200 to navigate to and access networked devices within the IT system. Further, traditional network management tools able to perform tasks within a traditional file system can be used.

In a first step, a file system daemon 215 represents each networked device in a virtual file system. The virtual file system may represent each networked device, resource of a networked device, property of a networked device, and/or property of a resource, as a file or as a file directory. Further, the virtual file system may associate a property of a networked device with the networked device. For example, the "owner" property having a value of "Acme" may be associated with a server represented as a file "server-1" in the virtual file system. Some networked devices within the IT system 100 may not be associated with a property. For example, a networked device such as a router may only appear in the virtual file system as a file with no properties associated with it.

In a second step, the application 205 receives an instruction from the user. The instruction comprises a command. The instruction may indicate a property of a networked device, a resource associated with a networked device, and/or a networked device. The digital device may be a networked device, such as a physical device. The command may indicate an action to be performed. Exemplary commands include "query", "open", "read", "get attributes", and the like. The application 205 may, in some embodiments, comprise a single interface such as a command line, graphical user interface (GUI), a script programming interface, and/or a batch processing interface.

In a third step, the virtual file system identifies at least one digital device associated with the instruction. The virtual file system may access data stored in the database 220 if the digital device is identified by the user using one or more queries to navigate to the digital device.

In a fourth step, the file system daemon 215 determines the command associated with the instruction. The command may be determined according to what information is required to implement the command. For example, the file system daemon may access the database 220 and then request that the device proxy 230 access a structured device 250, and/or an unstructured device 275 to implement a command.

In a fifth step, the device proxy 230 implements, or otherwise executes, the command. The device proxy 230, can implement the command by transforming the command into a form that may be received by a networked device. To transform the command, the device proxy 230 identifies the device and determines the terms and form that must be sent to implement the command.

After implementing the command, the networked device may transfer information to the file system daemon 215 via the device proxy 230 that may forward the information to the application 205 to be displayed to the user.

In other embodiments, a query is received from the interface. The file system daemon 215 can determine the command (e.g., "query) and the networked device identifier. The file system daemon 215 may then retrieve information from the database 220 to prepare a response to the query and send the information back to the application 205. This information may comprise, for example, query results, subdirectory information, properties of networked devices, an updated command prompt indicating a navigation pathway, and the like. In some embodiments, the display of information transmitted by the file system daemon 215 to the application 205 may be constrained by the interfaces of the networked device.

In one example, the user inputs a query for all servers owned by CompanyA. The file system daemon 215 receives and identifies the command as well as the networked device identifier (e.g., all networked devices that are servers of owner CompanyA). The file system daemon 215 can retrieve the information from the database 220 to satisfy the query and then send the results to the user through application 205.

Figure 3:
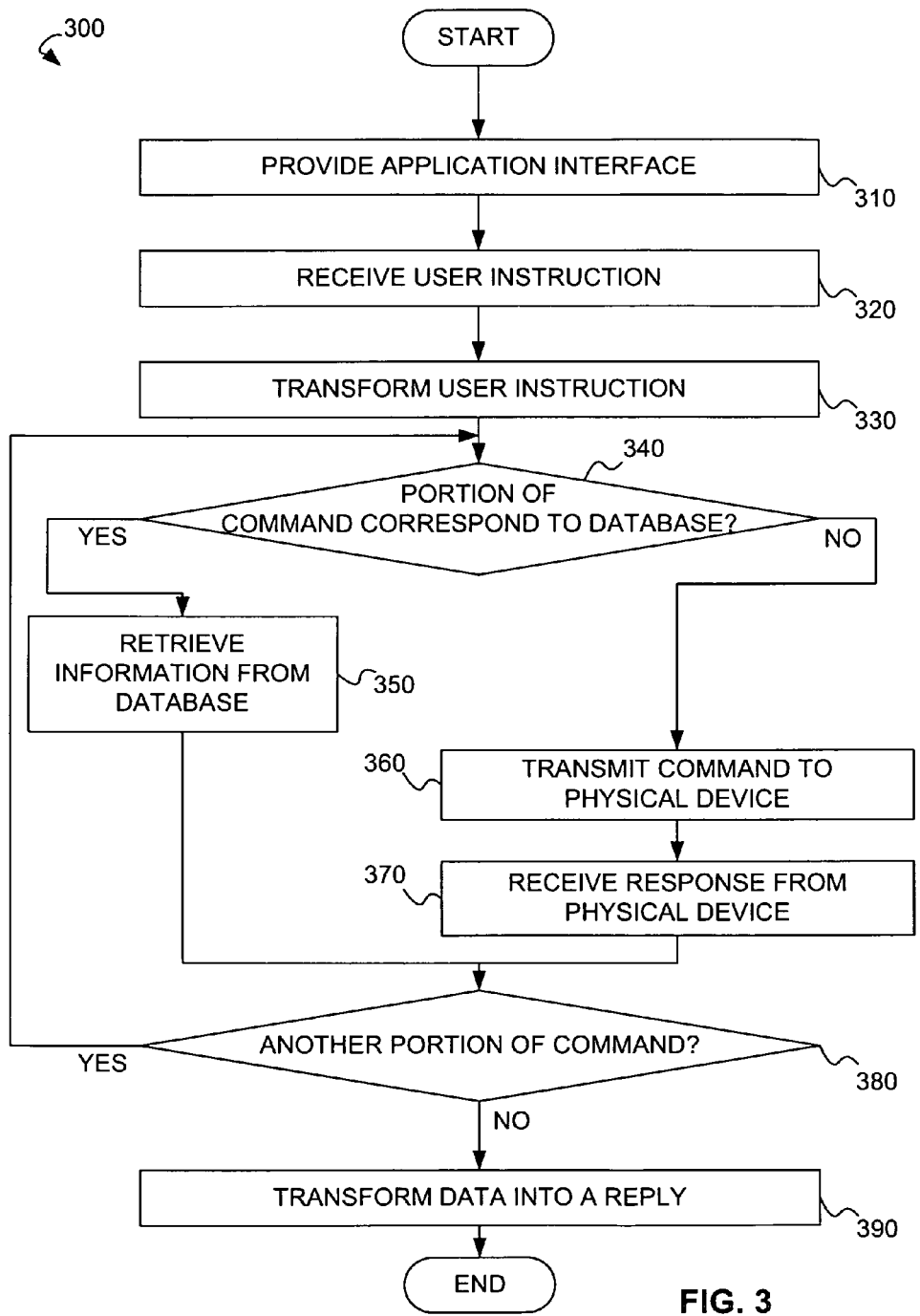
FIG. 3 is a flowchart illustrating a method for responding to a command, in accordance with various embodiments of the invention.

FIG. 3 is a flowchart illustrating a method 300 for responding to a user command, in accordance with various embodiments of the invention. The network management system 200 may perform method 300. In step 310, application 205 provides an interface to the user. In some embodiments, the interface may comprise a command line. In step 320, the application 205 receives a user instruction for data stored within the database 220. (i.e., a "query") and/or on one of the networked devices. The user instruction may comprise a series of one or more identifiers associated with an object, property, or resource.

In step 330, the operating system 210 transforms (i.e., parses) the user request into commands that can be executed by the file system daemon 215 and/or the device proxy 230, respectively. For example, the query may be represented as a file system command. In one example, each portion of the user instruction is processed to determine a command and a networked device identifier.

In step 340, a determination is made as to whether a portion of the command corresponds to the database 220. That is, whether a reply to the command can be generated based on the data stored in the database 220. In step 350, the file system daemon 215 retrieves the information from the database to satisfy the command. In one example, a query to identify one or more networked devices on the IT system may be received. Each networked device, resource, and property may be represented as objects within the database 220. As a result, the file system daemon 215 processes the query and returns the result of the query without sending commands to the device proxy 230.

In various embodiments, the database 220 comprises a table that identifies a networked device identifier. Resources within the remote networked device associated with the networked device identifier may be identified within the table. Similarly, properties relating to the remote networked device and/or the resources may also be identified within the table. Sub-tables containing instructions to transmit and receive commands to a remote networked device may be linked to the networked device identifier, the resource identifiers, and/or the property identifier.

In some embodiments, the file system daemon 215 may process the command to determine the networked device identifier, the resource identifier, and/or the property identifier within the command. The file system daemon 215 may send the networked device identifier and one or more commands to the device proxy 230 in step 360. In some embodiments, the device proxy 230 logs into the networked device associated with the command based on instructions from the file system daemon 215.

Optionally, in step 370, the device proxy 230 receives a response from the remote networked device. In step 380, a determination is made as whether the command comprises another portion. For example, a command may require data from both the database 220 and from a networked device. If another portion of the command has not been processed, the method 300 returns to step 340. If the command has been processed, the method 300 continues to step 390.

In step 390, the file system daemon 215 and/or the device proxy 230 processes the response to convert (e.g., format) the response to a form that may be displayed by an interface (e.g., the application 205). In various embodiments, the file system daemon 215 and/or the device proxy 230 identifies remote networked devices, resources, or identifiers within the response. The file system daemon 215 may then find similar identifiers within the database 220. The operating system 210 may convert the response into text that may be displayed to the user. Although FIG. 3 discusses a managing a remote networked device, or resources associated with the remote networked device, various embodiments may be used on local networked devices, local resources, and/or local properties.

If the device proxy 230 or file system daemon 215 cannot find any of the identifiers of the command within the database 220, an error message may be returned to the command line interface. In various embodiments, instructions on semantics or spelling may be provided to the user.

In another example, the network management system 200 receives a query. A query is a request for a listing of networked devices (remote or local), resources, and/or properties. In exemplary embodiments, a query begins by specifying a type of object that the user is searching for such as servers, computers, routers, or the like. A query that only includes the object type will return results indicating all objects of that type. Object types are classes of networked devices or resources. A class comprises all of the networked devices or resources with a similar feature. For example, a query for the object type "server" will return a list of all the servers in the database.

A query may request a list all computers (i.e., a type of networked device) operating Windows XP, for example. The file system daemon 215 can processes the query to identify any identifiers including networked devices (e.g., computer type identifier) and resource (e.g., Windows XP identifier). All managed networked devices and associated properties and resources, may be stored as objects within the database 220 coupled to the file system daemon 215.

The query can also identify specific properties that the user is querying. Examples may include owner, location, update, patch, or the like. A query that includes a property may also require a property value to be valid. The third portion indicates the property value that the user is querying for. For example, the values for the property "location" may include California, Australia, and New York.

Table 1.0 provides further examples and includes sample queries to illustrate the command line structure. The "$" represents the command prompt.

TABLE 1.0

| QUERY ELEMENTS | EXAMPLES | SAMPLE QUERY |
| --- | --- | --- |
| Object Type | "Server", "Routers", "computer", "printer" | $server/@/ $router/@/ |
| Property | "Location", "Owner", "update", "patch", "application" | N/A |
| Property Value | "California", Acme" | $computer/@Owner/Acme/@/ |

In accordance with further embodiments of the invention, multiple types of property values may be queried. Table 2.0 includes descriptions and examples for each type of property.

and have an owner value 'Acme' associated with the property "Owner." Likewise, server-3 and server-4 may be owned by Bigcorp Corporation and have an owner value 'Bigcorp.'

In various embodiments, the 'patch' property is an example of a multi-valued property. For example, if server-1 has both patches 'Q52346' and 'Q86355,' the property 'patch' may be associated with both the property values 'Q52346' and 'Q86355' in the model database 220. Likewise, server-2 may be associated with both property values 'Q04525' and 'Q75622' for the property 'patch.' A query for a multi-valued property will return results associated with each value included in the query. The query may contain any number of multiple value property values.

The values of properties may also be hierarchical. The 'location' property, for example, is hierarchical. To illustrate, if a server is located in Sunnyvale, Calif., U.S., the server is associated with a hierarchical property value such as "US/California/Sunnyvale" for the property "location." Likewise, the location of another server may be Gardenvale, Victoria, Australia and the value of the "location" property of the other server may be associated with a specified hierarchy such as "Australia/Victoria/Gardenvale." For a hierarchical property, the values of the property must be specified in the order of hierarchy.

The 'application' property associated with the software applications is an example of another hierarchical property. An object, however, may be associated with more than one application. For example, a server may include 'MySQL 5.0' and 'Apache 2.0.55' associated with specified hierarchical property values 'Database/MySqL/MySQL 5.0' and 'Webserver/Apache/Apache 2.0.55,' respectively.

A user can include multiple properties in a single query. For example, a query for objects of type 'server' for which property 'A' is associated with value 'aa' and property 'B' is associated with value 'bb' may be represented as:
   $server/@A/aa/@B/bb/@/
   $server/@B/bb/@A/aa/@/

To illustrate, the following paths are queries of the property values for servers having patch Q52346 and belonging to Acme:
   /server/@owner/Acme/@patch/Q52346/@//server/
      @patch/Q52346/@owner/acme/@/

A user may similarly combine queries for multiple value and hierarchical properties.

In further embodiments, queries may be composed of properties of varying types. For example, a query may comprise, a 'location' hierarchical property and a 'patch' multiple value property. To illustrate, a query for servers that are located at

TABLE 2.0

| PROPERTY VALUE TYPE | FORMAT | SAMPLE QUERY |
| --- | --- | --- |
| Single value | @S/s1/@/ | $computer/@Owner/Acme/@/ |
| Multiple value | @M/m1/@M/m2/@/ | $server/@patch/Q52346/@patch/Q75622/@/ |
| Hierarchical | @H/h1/h2/h3/@/ | $server/@location/US/California/Sunnyvale/@/ |
| Hierarchal and multiple value | @H/h1/h2/@H/ha/hb/@/ | $served@Application/Appserver/Tomcat/Tomcat5.5.12/ @Application/Webserver/Apache/Apache2.0.55/@/ |

A property value may comprise a single value or multiple values. For example, the 'owner' property is a single value property (e.g., there may be only one owner). For example, server-1 and server-2 may be owned by Acme Corporation, Sunnyvale associated with both patches 'Q52346' and 'Q86355' may be represented as:
   /served@location/US/California/Sunnyvale/@patch/
      Q86355/@patch/Q523460/

The syntax used in the above examples and illustrations is provided to illustrate a possible implementation of the present invention. This syntax is not intended to limit the scope of the present disclosure.

Queries may be received by the application 205. Once the query is processed to determine the identifiers and the action to be taken, information necessary to respond to the query may be retrieved from the database 220. The file system daemon 215 may organize and provide information retrieved from the database 220 to the application 205 in order to display a listing of object names to the user.

In some embodiments, the virtual file system may omit certain property value combinations during virtual file system navigation and/or a querying process. For example, if a user enters a path to query for objects based on properties "A" and "B" and a certain combination of values associated with these properties does not exist, the paths for the non-existent combination may not be formed. (e.g., subdirectories that do not contain desired information may not appear in response to the user's entry.) In one example, in a traditional file system, a user may request to list subdirectories in a directory to find a document. All subdirectories may be displayed in response to the user's request regardless of whether the subdirectories contain any documents at all. In the virtual file system, the user may request to list names of owners of a server running a specific version of backup software. In response, the names of owners of servers running the specific version of backup software are displayed and not the names of all owners. As a result, the user may not have the option to further navigate or query objects unrelated to the search.

Table 3.0 illustrates properties "A" and "B" associated with servers in various embodiments.

TABLE 3.0

| SERVER NAME | VALUE FOR PROPERTY "A" | VALUE FOR PROPERTY "B" |
| --- | --- | --- |
| server-1 | a1 | b1 |
| server-2 | a2 | b1 |
| server-3 | a2 | b2 |

It is important to note that, in this example, there is no server associated with both property values "a1" and "b2".

The user may compose a query by first querying for servers associated only with property value "a2". For example, the user may query for and server having property values "a2" and "b2" by entering:
  cd/@A/a2/@/
which returns the results "server-2" and "server-3". The user may further limit this query by entering:
  cd/@A/a2/@B/b2/@/
which returns "server-3". Or the user may enter:
  cd/@A/a2/@B/b1/@/
which returns "server-2".

The virtual file system, however, may limit what property values the user may enter to prevent the user from searching for a server based on property combinations that do not exist in the IT system 100. In the current example, if a user enters:
  cd/@A/a1/@/
the user may enter the query:
  cd/@A/a1/@B/b1/@/
which returns the result "server-1". However, the user is not allowed to enter the query:
  cd/@A/a2/@B/b1/@/
because no server exists that is associated with both of these property values.

Figure 4:
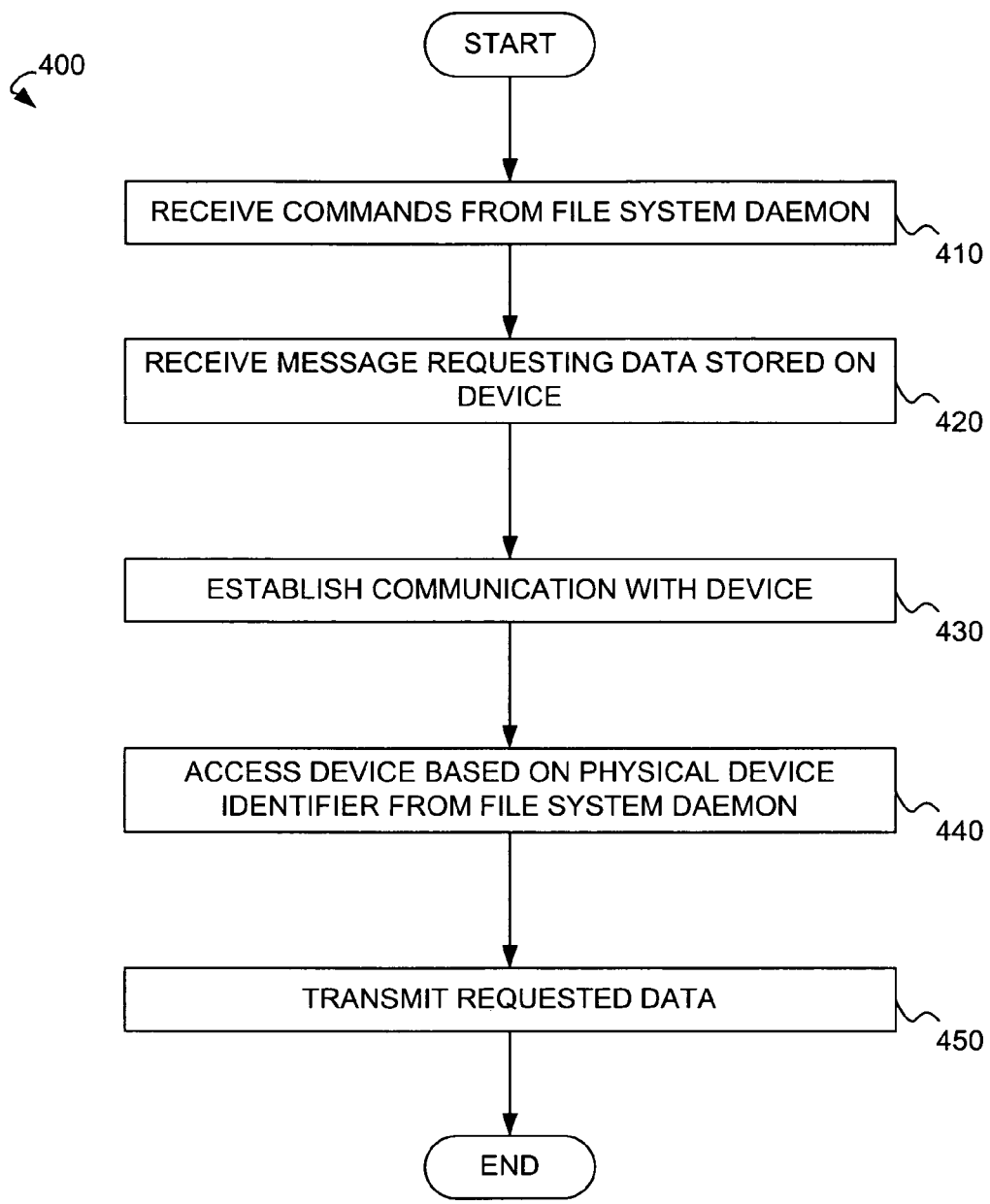
FIG. 4 is a flowchart illustrating a method for accessing a structured resource as performed by a device proxy, in accordance with various embodiments of the invention.

FIG. 4 is a flowchart illustrating a method 400 for accessing a resource as performed by a device proxy 230, in accordance with various embodiments of the invention. A networked device resource may be either a structured resource or an unstructured resource. A structured resource is a resource that is represented by the file system daemon 215 in a virtual file system. An unstructured resource is an application program or a service on a networked device that is executed by the networked device that is not identified by the file system daemon 215 or the database 220. An example of a structured resource is a file system associated with a server. An example of unstructured resource may be an application such as 'fdisk', or 'format' that is not identified within the database 220. To run an unstructured resource, for example, an application such as 'fdisk', the execution proxy 225 may be used to access the networked device.

The method 400 may be performed by the device proxy 230. The method 400 is initiated based on the instruction received from the user. The user may select a networked device or resource from a listing of query results returned by the file system daemon 215. In other embodiments, the user may provide a path to a specific networked device and/or resource in the network. For example, files stored on memory within a server identified as server-1 may be accessed using the following paths:
  $server/@/server-1/
  $server/@/server-1/files/

The operating system may interpret the instructions received from a command line interface to send commands to the file system daemon 215. The file system daemon 215 may identify networked devices and actions from the commands. The file system daemon 215 may provide this information to the device proxy 230.

In step 410, the device proxy 230 receives the networked device identifier as well as the appropriate action from the file system daemon 215. According to exemplary embodiments, the device proxy 230 may transform the appropriate action (i.e., command) into a command that can be processed by the networked device using a look-up table within the database 220 or a heuristic model. The device proxy 230 may communicate with different networked devices by using different network protocols. Device proxy 230 establishes a connection or otherwise communicates with the networked device in step 430.

In step 440, the device proxy 230 accesses the device based on a navigated pathway via the file system daemon 215. The navigated pathway may comprise an account associated with the device. Hence, the access to a resource and/or the type of access may depend on the privileges associated with the account on the networked device itself. As such, the privileges associated with the account login name may vary for different networked devices. Access to a resource on the networked device may be provided according to privileges stored on the networked device associated with account login name.

For example, for accessing a resource on 'server-1' using the account login name 'httpd', the command may be:
  /server/@/server-1/files/httpd/etc
The command requesting the same resource but using the account login name 'root' may be:
  /server/@/server-1/files/root/etc
In the above example, the user having account login name 'root' may have the permission to access resources on server-1, while the user having account login name 'httpd' does not have permission to access the resources. In the above example, the paths including the account login name permit access to the file system of server-1 via the native access controls of server-1. The device proxy 230 or the file system daemon 215 may retrieve permissions data from a permissions store in some embodiments to determine if the user logged into the network management system 200 has account rights to log into a networked device.

In various embodiments, permission to access or manage a networked device or resource may be within the database 220. In other embodiments, permission information is not retained. If the network management system 200 logs into a networked device with a username and password that does not have permission to perform some function, a response indicating the limitation may be received by the device proxy 230 from the networked device. The response is transformed into a form that may be displayed by the command line interface and the user is notified of the problem. Also in step 440, the device proxy 230 accesses and/or manipulates a resource of the networked device.

The networked device may receive the commands from the device proxy 230 and subsequently return a response. In step 450, device proxy 230 sends the response to file system daemon 215. In some embodiments, the file system daemon 215 and/or the device proxy 230 composes a reply based on the response from the networked device and the reply is provided to the user. The method 400 may be performed repeatedly in response to commands.

Figure 5:
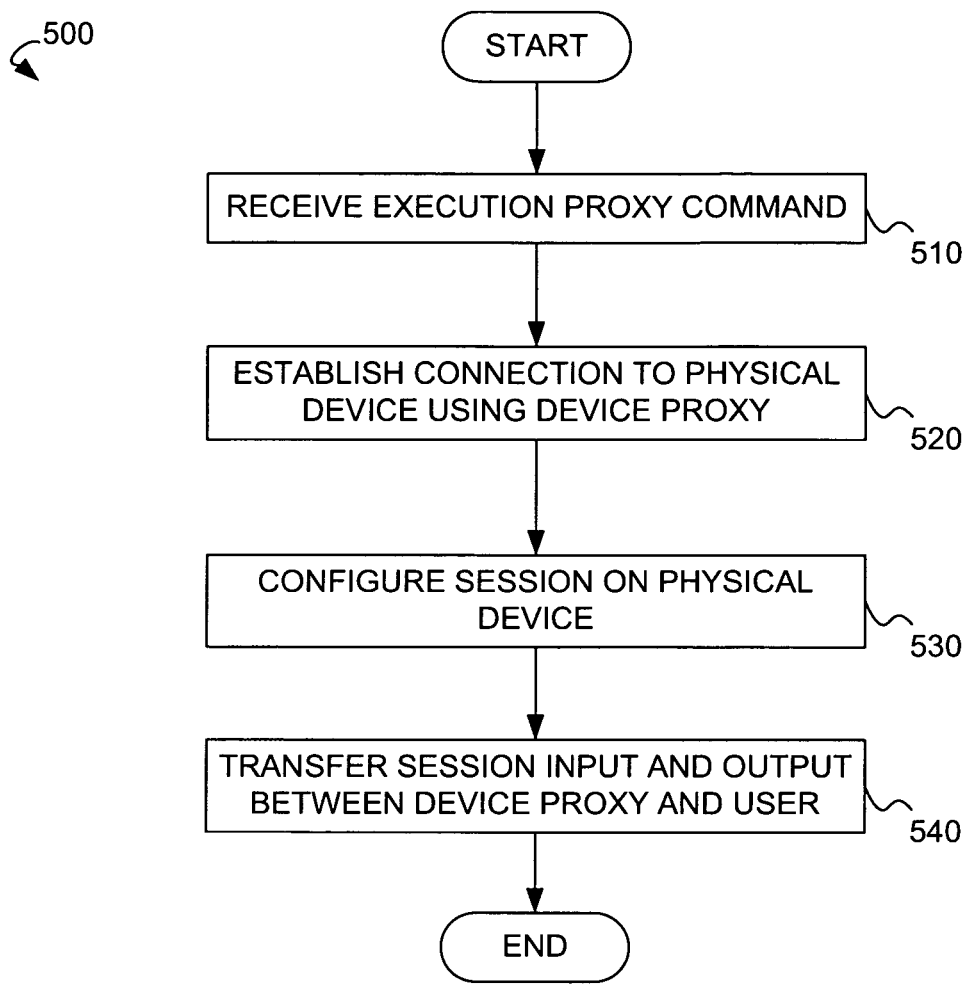
FIG. 5 is a flowchart illustrating a method for accessing an unstructured resource as performed by an execution proxy, in accordance with various embodiments of the invention.

FIG. 5 is a flowchart illustrating a method 500 for accessing an unstructured resource as performed by an execution proxy 225, in accordance with various embodiments of the invention. The method 500 may be performed by the execution proxy 225 if a user desires to run a program or access a service on a networked device. The execution proxy 225 allows a user to run a program at the networked device regardless of whether the appropriate resources/properties are identified in the database 220.

In step 510, an execution proxy 225 command is received. In one example, the user invokes the "execproxy" command at an interface. The execution proxy 225 may include a request to execute a specific program or service on a networked device. In other embodiments, only the physical object may be specified. The execution proxy 225 may first be activated by the user before the execution proxy 225 command is received, or the user may call the execution proxy 225 with the command.

In some embodiments, the device proxy 230 establishes a connection or other communicative link between execution proxy 225 and networked device in step 520. In other embodiments, the execution proxy 225 establishes the communication directly with the networked device. In one example, via the application 205, the user may set the working directory on server-1 to '/etc' and initiate a login shell. The shell running on server-1 may output the command prompt "[httpd@server-1/etc]$" or "[root@server-1/etc]$" depending on the permissions associated with the user. The information contained within the brackets can indicate the username logged into the networked device.

In step 530, the execution proxy 225 may configure a session with the networked device. A session may comprise a series of communications transferred between the execution proxy 225, and the networked device. The session may be further identified by, for example, a resource, a time period, and/or a type of task to be performed. In step 540, after the session with the networked device is established, session input and output values (e.g., commands) may be transferred between the application 205 and the resource using the execution proxy 225 and/or the device proxy 230. In accordance with various embodiments of the invention, execution proxy 225 may transfer data such as an executable code and/or parameters to start a process on networked device.

For an 'unstructured resource' such as an application program 'fdisk', the commands in the command line shell may be represented as:

$cd/server/@/server-1/files/root/etc
$execproxy fdisk

In the above example, the 'fdisk' program is executed on server-1 and accessed using the execution proxy 225. The user receives the output of and sends input to the running 'fdisk' program via the device proxy 230 and/or the execution proxy 225.

As discussed herein, the user is able to access the networked device based on permissions associated with an account login name. For example, an unstructured resource 'fdisk' on 'server-1' is accessed via account login name 'httpd.' The following command:

$ cd/server/@/server-1/files/httpd/etc
$ execproxy fdisk may generate an error message if the resource account 'httpd' does not have the privileges to run 'fdisk' on server-1. Similarly, various commands such as 'pwd', 'id', 'cat', or the like may be executed. The output of these commands may be based on the account login name. In the above example, input from the user is sent via the execution proxy 225 and/or the device proxy 230 to the shell running on server-1 and output from the shell is returned to the user via the device proxy 230 and/or the execution proxy 225.

The system and method as described represent a database and networked devices of an IT system as a hierarchy. As those skilled in the art will recognize a hierarchal organization, the system, method and machine readable medium described herein allows users to more easily interactively access and manipulate the IT system and/or develop management software to access and manipulate the IT system.

In various embodiments, the ability of a user to manipulate the IT system as a virtual file system through a standard interface such as a unix command line allows the user to program batch processes. The user, using simple commands, can code multiple actions within a program that can act on a file system and apply the program to the virtual file system. Instead of the multiple actions being limited to manipulating documents and files, the multiple actions can address making changes to multiple networked devices, resources, and properties or any combination thereof. As a result, many changes within an IT system may occur easily without learning new syntax or programming for multiple interfaces, application programming interfaces (APIs), or applications. Further, users may leverage existing tools, skills, experience, and/or techniques to manage IT system 100.

The above-described modules can be comprised of instructions that are stored on storage media (e.g.; a computer readable storage medium). The instructions can be retrieved and executed by a processor within a digital device. The digital device may also comprise storage media (e.g., hard drive, ram, optical media, tape, flash memory). Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for managing a plurality of physical devices, the method comprising:
   representing a property of a physical device of the plurality of physical devices and a property of a resource as objects in a virtual file system;
   receiving, by an input device, an instruction associated with the property of the physical device and another instruction associated with the resource from a single interface;
   identifying, by a processor, the physical devices of the plurality of physical devices associated with each instruction;
   determining, by the processor, the commands associated with each instruction; and
   implementing the commands;
   wherein the property of the physical device comprises an IP address and the property of the resource comprises information associated with the resource.

2. The method of claim 1, wherein implementing the commands comprises determining respective formats of the commands appropriate to the respective identified physical devices.

3. The method of claim 2, further comprising receiving a response from at least one physical device.

4. The method of claim 3, further comprising formatting the response to a form appropriate for the single interface.

5. The method of claim 2, further comprising initiating at least one process on at least one identified physical device via at least one formatted command.

6. The method of claim 1, wherein the physical device comprises a server, a computing device, a router, or a switch.

7. The method of claim 1, wherein implementing the commands comprises performing a query of the objects within a database.

8. The method of claim 1, wherein the objects comprise identifiers of one or more physical devices, resource, or properties.

9. The method of claim 1, wherein the single interface is a standard shell application.

10. A system for managing a plurality of physical devices, the system comprising:
    a processor;
    a file system daemon configured to represent a property of a physical device of the plurality of physical devices and a property of a resource as objects in a virtual file system, receive an instruction associated with the property of the physical device and another instruction associated with the resource from a single interface, identify the physical devices of the plurality of physical devices associated with each instruction, and determine the commands associated with each instruction; and
    a device proxy configured to implement the commands;
    wherein the processor is configured to execute at least one of the file system daemon and the device proxy; and
    wherein the property of the physical device comprises an IP address and the property of the resource comprises information associated with the resource.

11. The system of claim 10, wherein the device proxy is configured to determine respective formats of the commands appropriate to the respective identified physical devices.

12. The system of claim 11, wherein the device proxy is further configured to receive a response from at least one physical device.

13. The system of claim 12, wherein the device proxy is further configured to format the response to a form appropriate for the single interface.

14. The system of claim 11, wherein the device proxy is configured to initiate at least one process on at least one identified physical device via at least one formatted command.

15. The system of claim 10, wherein the physical device comprises a server, a computing device, a router, or a switch.

16. The system of claim 10, wherein the device proxy configured to implement the command comprises performing a query of the physical devices within a database.

17. The system of claim 10, wherein the objects comprise identifiers of one or more physical devices, resources, or properties.

18. The system of claim 10, wherein the single interface is a standard shell application.

19. A non-transitory computer readable medium having embodied thereon a program, the program being executable by a processor for performing a method for managing a plurality of physical devices, the method comprising:
    representing a property of a physical device of the plurality of physical devices and a property of a resource as objects in a virtual file system;
    receiving an instruction associated with the property of the physical device and another instruction associated with the resource from a single interface;
    identifying the physical devices of the plurality of physical devices associated with each instruction;
    determining the commands associated with each instruction; and
    implementing the commands;
    wherein the property of the physical device comprises an IP address and the property of the resource comprises information associated with the resource.

* * * * *